United States Patent

Hirasawa et al.

[11] Patent Number: 5,200,860
[45] Date of Patent: Apr. 6, 1993

[54] LENS POSITION CONTROL DEVICE

[75] Inventors: Masahide Hirasawa; Hirofumi Suda; Naoya Kaneda; Hiroyuki Wada, all of Kanagawa, Japan

[73] Assignee: Canon Kabushiki Kaisha, Tokyo, Japan

[21] Appl. No.: 913,983

[22] Filed: Jul. 16, 1992

Related U.S. Application Data

[63] Continuation of Ser. No. 707,942, May 28, 1991, abandoned, which is a continuation of Ser. No. 362,265, Jun. 6, 1989, abandoned.

Foreign Application Priority Data

Jun. 9, 1988 [JP] Japan .................. 63-142079

[51] Int. Cl.$^5$ .................. G02B 7/11; G03B 3/00
[52] U.S. Cl. .................. 359/696; 354/400; 354/403
[58] Field of Search .................. 350/429, 430, 255; 354/400, 402–404, 408; 355/56; 250/201.2

[56] References Cited

U.S. PATENT DOCUMENTS

| | | | |
|---|---|---|---|
| 4,847,650 | 7/1989 | Iida et al. | 354/400 |
| 4,861,146 | 8/1989 | Hatase et al. | 350/429 |
| 4,920,369 | 4/1990 | Kameda et al. | 354/402 |
| 4,936,664 | 6/1990 | Haraguchi et al. | 359/696 |
| 5,001,509 | 3/1991 | Hamada et al. | 354/403 |

*Primary Examiner*—Bruce Y. Arnold
*Assistant Examiner*—James Phan
*Attorney, Agent, or Firm*—Fitzpatrick, Cella, Harper & Scinto

[57] ABSTRACT

A lens position control device for a lens system, including a variator and a compensator which also serves as the focusing lens, comprises a detecting circuit for detecting positions of the variator and the compensator, a memory circuit for storing a plurality of pieces of information representing the manners in which the movement of the compensator is to be controlled in accordance with the positions of the variator and the compensator detected by the detecting circuit, the information concerning with at least the speed and the moving direction, a first control circuit responsive to operation of the zoom actuator for controlling the movements of the variator and the compensator, the first control means controlling the movement of the compensator in accordance with the information stored in the memory circuit, and a second control circuit responsive to detection of when the continuously read two pieces of information read out from the memory circuit come to differ from each other in the moving direction for controlling the movement of the compensator in a different manner from that indicated by the read information.

26 Claims, 13 Drawing Sheets

FIG.9
(PRIOR ART)
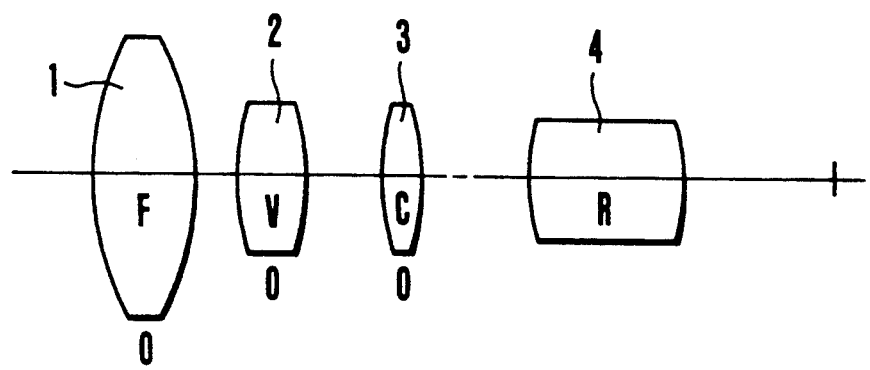
FIG.10(A)
(PRIOR ART)
FIG.10(B)
(PRIOR ART)
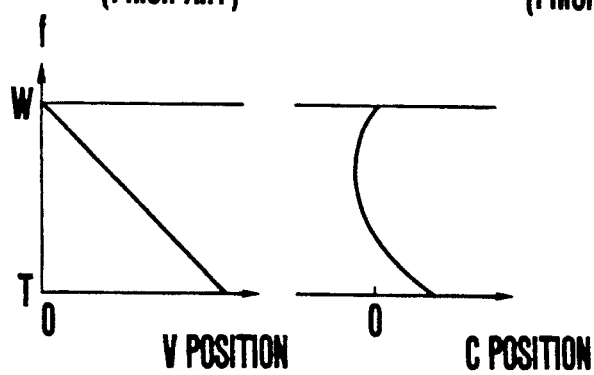
FIG.11
(PRIOR ART)
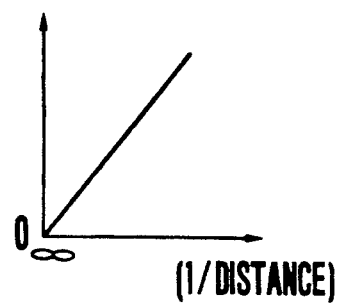

(a)
(b)
(c)
(d)
(e)

POSITION OF LENS GROUP FOR FOCUS ADJUSTMENT

LENS POSITION CONTROL DEVICE

This application is a continuation of application Ser. No. 07/707,942 filed May 28, 1991, which is a continuation of Ser. No. 07/362,265, filed Jun. 6, 1989, both now abandoned.

BACKGROUND OF THE INVENTION

1. Field of the Invention

This invention relates to lens position control devices in optical instruments such as cameras, observation instruments, etc.

2. Description of the Related Art

The general form of a zoom lens (which has found a use in video cameras) is comprised of fur lens groups as shown in FIG. 9.

In FIG. 9, the first lens group 1 arranged at the front of a lens barrel functions as a focusing lens (F). The second lens group 2 is the variator (V) for varying the focal length of the entire system. The third lens group 3 is the compensator (C) for bringing a plane of sharp focus to the proper position after the focal length varying operation. The fourth lens group 4 is the relay lens for forming an image of an object. Incidentally, FIG. 9 shows that the zoom lens set at the wide-angle end (the shortest focal length) and focused on an object at infinity. In the following, for explanation of the way in which each lens group moves, the positions of the lens group 1 (F), the lens group 2 (V), and the lens group 3 (C) in this state are considered here as respective zero (0) positions.

FIGS. 10(A) and 10(B) to FIG. 12 show the relationships of the variations of the positions of the lens groups 1, 2 and 3 (F, V and C) with the focal length of that zoom lens or the object distance. By reference to these figures, the features of that zoom lens are described below.

FIG. 10(A) is a graph of the position to which the lens group 2 (V) has moved along an optical axis taken in the abscissa and the focal length f of the zoom lens taken in the ordinate, illustrating how the focal length f varies when the lens group 2 (V) moves. Incidentally, W represents the wide-angle position where the focal length of the zoom lens becomes shortest, and T represents the telephoto position where the focal length of the zoom lens becomes longest.

FIG. 10(B) is a graph of the axial position of the lens group 3 (C) taken in the abscissa and the focal length f of the zoom lens taken in the ordinate, illustrating the variation of the focal length f with the variation of the position of the lens group 3 (C).

FIG. 11 is a graph of the reciprocal of the distance (in meters) to an object to be photographed taken in the abscissa and the position to which the lens group 1 (F) is moved forward along the optical axis taken in the ordinate, illustrating the variation of the object distance with the variation of the position of the lens group 1 (F).

FIG. 12 is a graph of the position to which the lens group 1 (F) is moved forward along the optical axis taken in the ordinate and the focal length f of the zoom lens taken in the abscissa, illustrating the relationship between the position of the lens group 1 (F) and the focal length f and exemplifying a number of positions of the lens group 1 (F) about the respective cases where the distance to the object is 1 m, 2 m, 3 m, or infinity.

It is understoqd from these graphs that the publicly known zoom lens has the following features. That is, as is apparent from FIG. 11 and FIG. 12, in a case where the object distance does not change, even when the focal length is changed by zooming, there is no need to move the lens group 1 (F). Therefore, the lens group 2 (V) and the lens group 3 (C) may be interlocked with each other according to the characteristic curves of FIGS. 10(A) and 10(B). Therefore, the position of each lens group can be relatively easily controlled. Thus, there is a merit that its position control can be carried out by a mechanical control mechanism such as a cam.

FIG. 13 is a view illustrating the interlocking mechanism of the lens group 2 (variator lens) and the lens group 3 (compensator lens) of the publicly known zoom lens. In FIG. 13, a lens group holding frame 5 holding the lens group 2 (V) and another lens group holding frame 6 holding the lens group 3 (C) are guided along the optical axis by guide bars 7 and 8. A cam tube 9 has camming slots 9a and 9b into which pins 5a and 6a mounted on the lens group holding frames 5 and 6 are inserted respectively. A fixed tube 10 is fitted on the outer diameter of the cam tube 9 and fixedly secured to a stationary member such as lens barrel. A zoom actuating ring 11 is fixed to the cam tube 9 by a connector 11a and fitted on the outer diameter of the fixed tube 10 only rotatably relative thereto. During zooming, the zoom actuating ring 11 is rotated, which in turn rotates the cam tube 9. As a result, the relative position of the pin 5a in the camming slot 9a and the relative position of the pin 6a in the camming slot 9b change so that the lens group holding frame 5 and the lens group holding frame 6 are moved along the axial axis relative to each other.

However, the prior known control mechanism using the cam tube has also a disadvantage in that the fitting tolerances of the cam tube and the machining tolerance of the camming slots have to be made very severe and, therefore, the production cost is very high.

Moreover, as is apparent from FIG. 11 and FIG. 12, in the conventional zoom lens, to focus on the object at a closest distance (for example, 1 m or less), the total focusing movement of the lens group 1 (F) must be increased in proportion to the inverse number of the distance. As the minimum object distance decreases, the total focusing movement increases infinitely. Hence, there is a fundamental drawback that close-up photography at the minimum object distance is impossible.

On this account, in recent years, a zoom lens in which one of the lens groups other than the lens group 1 (F) is moved for focusing, i.e., a zoom lens of the so-called inner focus type, is proposed.

An example of this zoom lens, as shown in FIG. 14, though including the lens group 1 and the lens group 2, lacks the lens group 3 equivalent to the conventional compensator. In this zoom lens, while the lens group 1 and the front lens 4A (R) of the lens group 4 are arranged to be stationary, the lens group 2 (variator) is arranged likewise as in the publicly known zoom lens of FIG. 9 to move when the focal length is varied. Also, the rear lens 4B (RR) of the relay lens group 4 has functions of focus adjustment and compensation. By making the rear lens 4B move along the optical axis likewise as the conventional compensator lens, focus adjustment and compensation are performed.

Another example of construction and arrangement of the inner focus type zoom lens is shown in FIG. 17. In this case, four lens groups are in use and the lens group 2 has the function of varying the focal length likewise as the conventional 4-group zoom lens of FIG. 9. However, what is different in comparison with FIG. 9 is that the lens group 1 is fixedly secured to the fixed lens barrel 101. For this reason, the lens group 3 which would do only the compensating work in the prior art, has to have the focusing function.

In the zoom lens having such a construction and arrangement of the lens groups, because the lens group 1 is arranged not to move, focusing can be effected even to very short distances, but, because the relative positional relationship between the movable lens groups, i.e., the lens group 2 and the rear relay lens 4B of FIG. 14, or the lens group 3 of FIG. 17, is very complicated, such a cam mechanism or other simple control mechanism as shown in FIG. 13 does not suffice for controlling the differential movement of the lens group 2 and the rear relay lens 4B of FIG. 14 or the lens group 3 of FIG. 17. Therefore, it is very difficult to realize the zoom lens of the form shown in FIG. 14 or FIG. 17, so long as the mechanical mechanism only is available.

FIG. 15 is a graph of the position of the lens group 2 (V) of the zoom lens of FIG. 14 taken in the abscissa and the position of the rear relay lens 4B (RR) taken in the ordinate, illustrating the relative positional relationship of both lenses in discrete values of the object distance. As is apparent from FIG. 15, because the relative positional relationship of both lenses varies as the distance of the object varies from infinity to progressively smaller values of 3 m, 1 m, 0.5 m, 0.2 m, 0.01 m, it is understandable that with a simple control mechanism such as the cam, it is impossible to control both lenses.

Recently, however, there has been made a proposal for employing a control method that depending on the result of detection of whether or not the sharp image is formed at a right place or focal plane, the rear relay lens 4B only is controlled relative to the lens group 2, so that the zoom lens of FIG. 14 is realized. There has also been announced a commodity developed on the basis of this proposal.

FIG. 16(A) is a schematic view illustrating the lens position control method and the lens form employed in that proposal and commodity. The zoom lens includes a lens group 1, a lens group 2, a front lens 4A of a relay lens group 4, a rear lens 4B of the relay lens group 4, a detecting means 12 for detecting an image formed on the focal plane, a focus control (AF) circuit 13 for detecting when the image is in focus, and for controlling focusing, and a drive means 14 controlled by the AF circuit 13 to perform position determination and driving of the rear relay lens 4B.

FIG. 16(B) to FIG. 16(D) show an example of the automatic focus adjusting device. In FIG. 16(B), an entire picture area 17 of the video camera contains therein a spot 18 from which a signal for distance measurement is taken out. Also, an actual object is assumed to have a contrast 19. In FIG. 16(C), part (a) is that fragment of this contrast which enters the spot 18. Then, (b) is a Y signal output, (c) represents the differentiated value of the Y signal, (d) is its absolute value, and (e) is the peak-held signal, where the height A represents the degree of focus (hereinafter called the "blur evaluation value"). FIG. 16(D) is a graph with the abscissa in the position of the lens group 1 of FIG. 9 or the lens 4B of FIG. 14, and the ordinate in the blur evaluation value A. The in-focus state comes out at the position B of the peak.

As another or improved method, Japanese Laid-Open Patent Application No. Sho 62-296110, Japanese Laid-Open Patent Application No. Sho 62-284316, etc. have been proposed. This method memorizes the unit movement amount of the lens having both the function of the compensator and the focusing function (hereinafter called the "double-purpose" lens) in correspondence with the predetermined movement amount of the variator lens according to either the position information of the variator lens and the double-purpose lens or the position information of the variator lens and the distance operating member (distance ring), so that each time the variator lens is moved by a predetermined amount, the movement of the double-purpose lens is controlled on the basis of the memorized unit movement amount.

By the way, in the publicly known zoom lens and lens position control method shown in FIG. 16(A), if the accuracy and speed of the input signal from the image detecting means 12 to the AF circuit 13 are high, the image formed on the focal plane would not be blurred or distorted. In fact, however, by the response delay etc. due to the cycle of distance measurement etc., the possibility of lowering the accuracy of control of the rear relay lens 4B is very high. Hence, there is a serious drawback that a large blurring is liable to occur.

Also, in the above-described improved method, because the detection of the predetermined amount of movement of the variator lens becomes the premise, in order to obtain a highly accurate movement of the aforesaid double-purpose lens, there is need to make go extremely fine the amount of movement of the variator lens. Further, the moving speed of this double-purpose lens must be increased. Otherwise, it would take a considerably long time to correct the produced blur.

SUMMARY OF THE INVENTION

One aspect of this invention is to provide a lens position control device which enables a zoom lens to be constructed in such a form that despite the presence of a response delay due to the cyclic distance measuring process a large blurring is not caused to occur, and that the detection of the position of the variator is not necessarily made too fine when the large blurring is prevented from occurring. Particularly, when in applying the lens position control device to the lens group which performs the function of compensating at the time of variation of the focal length and the focusing function, the unnecessary action is obviated to prevent a faulty operation from occurring when focusing.

BRIEF DESCRIPTION OF THE DRAWINGS

FIG. 9 illustrates the conventional common form of a zoom lens to which the invention is not applicable.

FIGS. 10(A) and 10(B) are graphs illustrating the motion characteristic of the variator lens and the motion characteristic of the compensator lens in the aforesaid common zoom lens.

FIG. 11 and FIG. 12 are graphs illustrating the relationships of the position of the lens group 1 with the object distance and the focal length in the common zoom lens of FIG. 9, respectively.

DETAILED DESCRIPTION OF THE PREFERRED EMBODIMENTS

Figure 1:
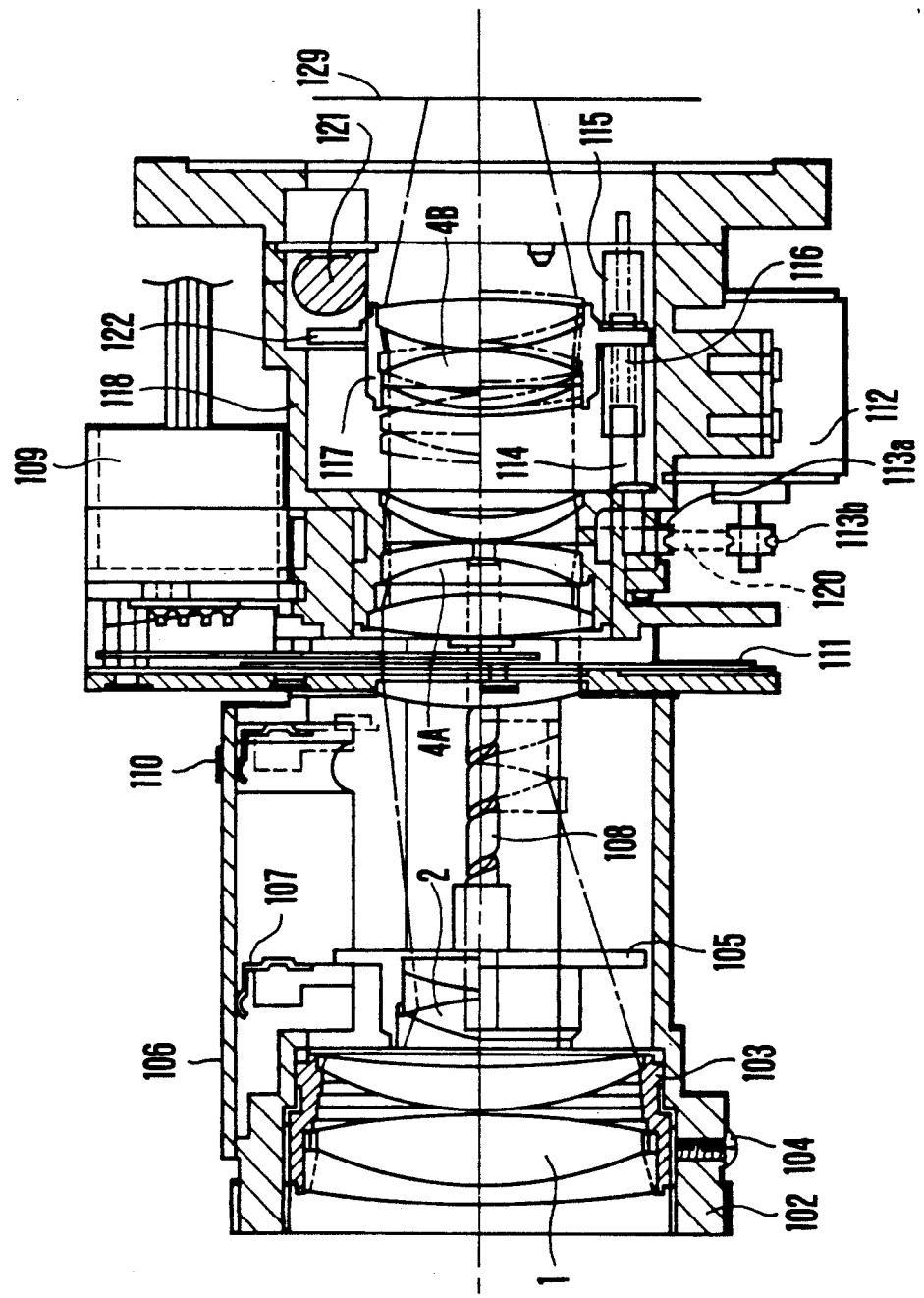
FIG. 1 is a longitudinal section view of the zoom lens of an embodiment of the lens position control device in the optical instrument according to the present invention.

The lens position control device of the invention is next described in detail on the basis of illustrated embodiment shown in the drawings.

FIG. 1 in sectional view shows the zoom lens barrel to which an embodiment of the lens position control device according to the invention has been applied.

Figure 14:
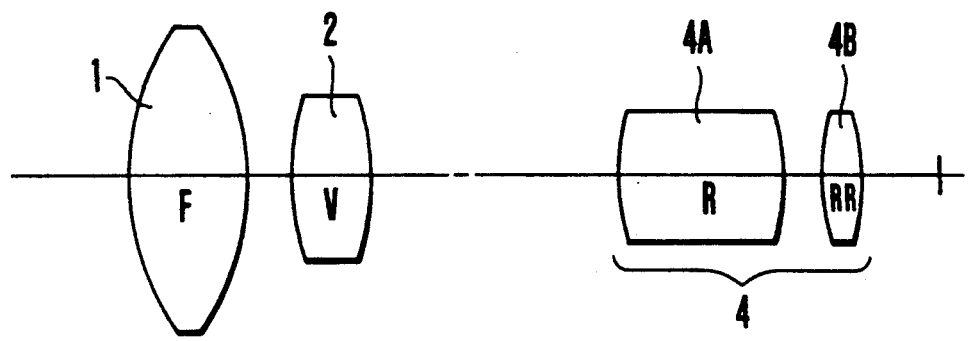
FIG. 14 is a schematic view illustrating a form of zoom lens which becomes the target of application of the invention.
Figure 15:
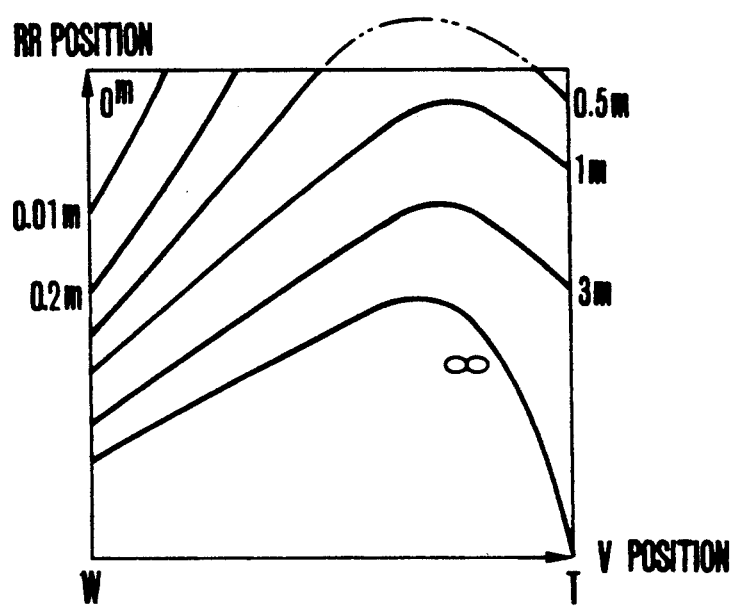
FIG. 15 is a graph displaying the relative position relationship, in discrete values of the object distance, between the variator lens (V) and the rear relay lens (RR) in the zoom lens shown in FIG. 14.
Figure 16A:
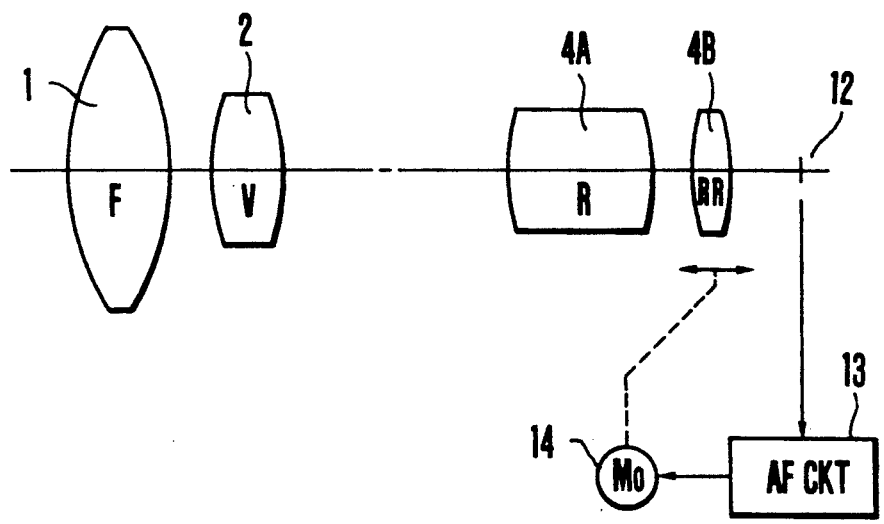
FIG. 16(A) is a schematic view illustrating the publicly known control method for controlling the zoom lens shown in FIG. 14.
Figure 16B:
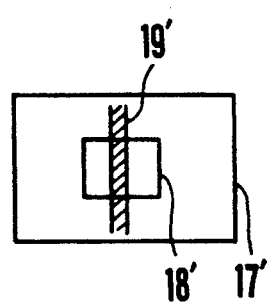
FIGS. 16(B) to 16(D) illustrate the AF principle.
Figure 16C:
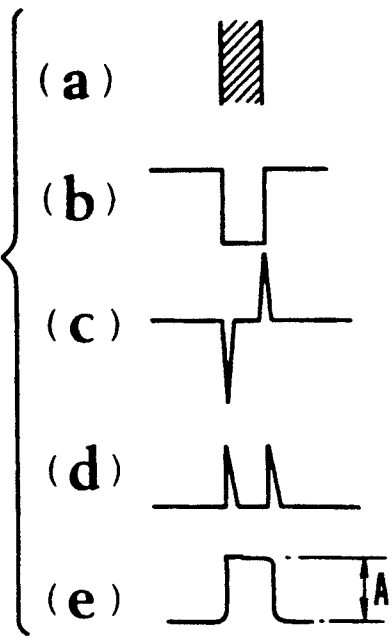
Figure 16D:
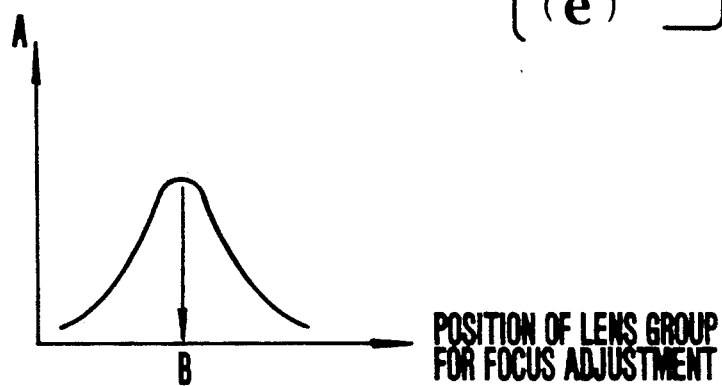

In the same figure, 1, 2, 4A and 4B are the lens groups already explained in FIG. 14. The lens group 1 is fixedly secured to a holding frame 103 which is screw-threaded into a fixed tube 102 so that the lens group 1 can take the optimum position relative to the tube 102, and, after adjustment, fixedly secured by a screw fastener 104. The lens group (variator) 2 is fixedly mounted in a variator moving ring 105 which moves in thrust directions (axial directions) as guided by a bar 108. Here, the bar 108 has a helical groove of "V" profile formed in the outer periphery thereof with a lead as shown in the figure. A ball (not shown) is carried on the variator moving ring 105 and is pressed against this V groove by a leaf spring (not shown) fixed to the variator moving ring 105 so that the position of the variator 2 is determined. Its position can be varied by rotating the bar 108 with the help of a zoom motor 140 shown in FIG. 2. Also, the variator moving ring 105 has a brush 107 mounted thereon and arranged to slide on an encoder substrate 106. The brush 107 and the substrate 106 constitute an encoder for the variator 2. An iG meter 109 drives diaphragm blades 111 and controls the size of opening of the diaphragm aperture. The lens group 4A is fixedly mounted in a barrel 118.

Meanwhile, the rear relay lens group (RR) 4B is fixedly mounted to a moving ring 117. The moving ring 117 is provided in unified form with an axially elongated sleeve 115 having female screw-threads cut in the inner surface thereof. This sleeve 115 engages on a drive shaft 114 having male screw-threads cut in the outer periphery thereof, restrained from axial movement and arranged to rotate around the optical axis. This drive shaft 114 fixedly carries a pulley 113a at one end thereof. An endless V belt 120 is trained between the pulley 113a and another pulley 113b on the output shaft of a step motor 112. That is, rotation of the output shaft of the step motor 112 is transmitted through the V belt 120 to rotate the drive shaft 114, which in turn causes the sleeve 115 to worm in or out. Thus, the axial position of the rear relay lens group 4B can be varied.

Here, suppose, for example, the pitch of the thread of the sleeve 115 is 0.35 mm, the ratio of the drive shaft pulley 113a to the pulley 113b is 2, and the angle of rotation of the step motor 112 per an input pulse is 18 degrees, then when one pulse enters the step motor 112, the lens group 4B axially moves 8.75 $\mu$m. If the effectivity of the movement of the lens group 4B on the focal plane, i.e., the image plane 129, is set to 1.0 or thereabout, the deviation of the position of lens group 4B from the in-focus position by an amount equivalent to one pulse is reflected to produce a circle of confusion whose diameter is on the order of 10 $\mu$m. This order of tolerance assures that a sufficiently high accuracy of focusing control can be obtained.

The present embodiment uses the number of input pulses to the step motor 112 for detecting the position of the lens group 4B which has both the functions of the compensator and the focusing lens. In this regard, the lens group 4B must be moved to a predetermined or 0 address when the electric power source of the camera turns on or off. In the present embodiment, the position at which a rear end portion 122 of the moving ring 117 abuts on a 0 address adjusting cam 121 is taken as the 0 address.

Figure 5:
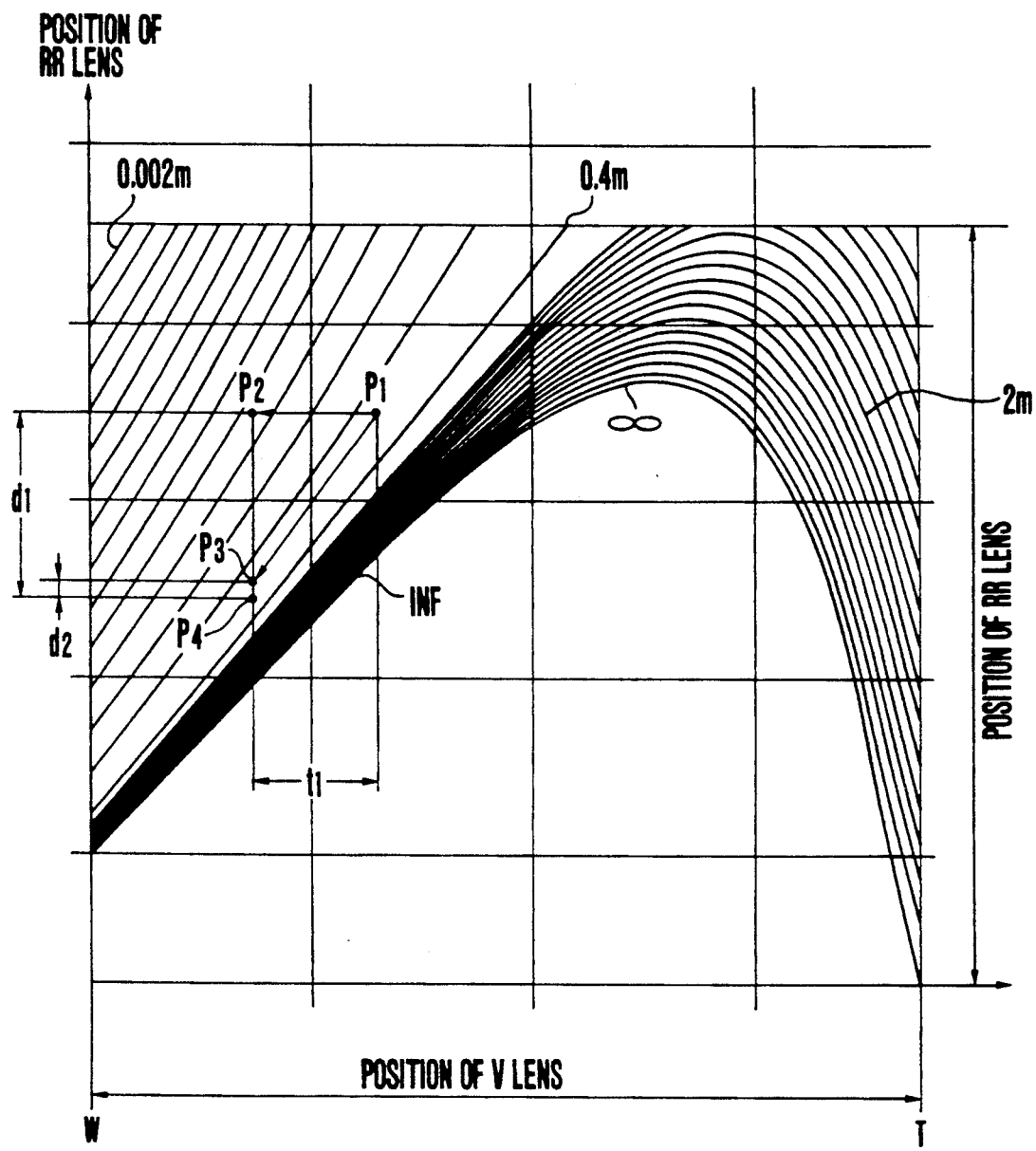
FIG. 5 is a map displaying the relative positional relationship of two movable lenses in the zoom lens as the optical instrument to which the invention is applied in discrete values of the object distance and used to explain the principle of the invention.

Accordingly, in the thus-formed zoom lens system, the correlation of the position of the lens group 2 (hereinafter referred to as "V") and the position of the rear relay lens group 4B (hereinafter referred to as "RR") is expressed as shown in the graph of FIG. 5 with a parameter representing the object distance.

In FIG. 5, suppose the position of the RR and the position of the V detected by the position detecting means are determined to be a point $P_1$, and the distance measurement in the focus control means for controlling this zoom lens is cycled in a period $t_1$. Further, assuming that at the same time that a movement of the V has been effected, the cycle of distance measurement is started, the positional relationship between the V and the RR is considered to change to a point $P_2$ until the next distance measurement result comes out.

Alternatively, suppose the RR is made to move at the same time as the movement of the V, even if the correction is not made by the distance measurement, the relative positional relationship between the V and the RR becomes a value represented by, for example, a point $P_3$. As a result, the discrepancy between it and the ideal point $P_4$ becomes $d_2$. When the effectivity of the V on the focal plane at the focal length of each of the points $P_1$ to $P_4$ is expressed by 1.0, letting the F-number at this time be denoted by F, the diameter of a circle of confusion produced is zero at the point $P_4$, $d_2/F$ at the point $P_3$, or $d_1/F$ at the point $P_2$. Here, on the assumption that $d_1 = 5d_2$, the degrees of blur at the points $P_2$ and $P_3$ appear to differ 5 times in a circle of confusion from each other. Although this dependent movement of the RR is found under the premise that the object distance does not change, the use of it produces a great advantage in improving the rate of occurrence of blurring during zooming.

However, to realize this idea perfectly, the positions of the V and the RR must be sensed accurately so that the point $P_1$ is determined. On the correct prediction of a characteristic curve passing through the point $P_1$, the required moving speed of the RR must then be worked out. Therefore, an enormous amount of computation has to be performed. As a result, a large scale computing circuit must be used. This gives rise to a problem that the cost of the focus control means amounts to a very high price.

Therefore, it is the present invention that employs a method that the map shown in FIG. 5 is divided into numbers of zones in both the direction of movement of the V and the direction of movement of the RR, depending on the necessary precision accuracy, and representative speeds of the respective zones are memorized in a speed data memory 131 to be described later in FIG. 2.

Figure 6:
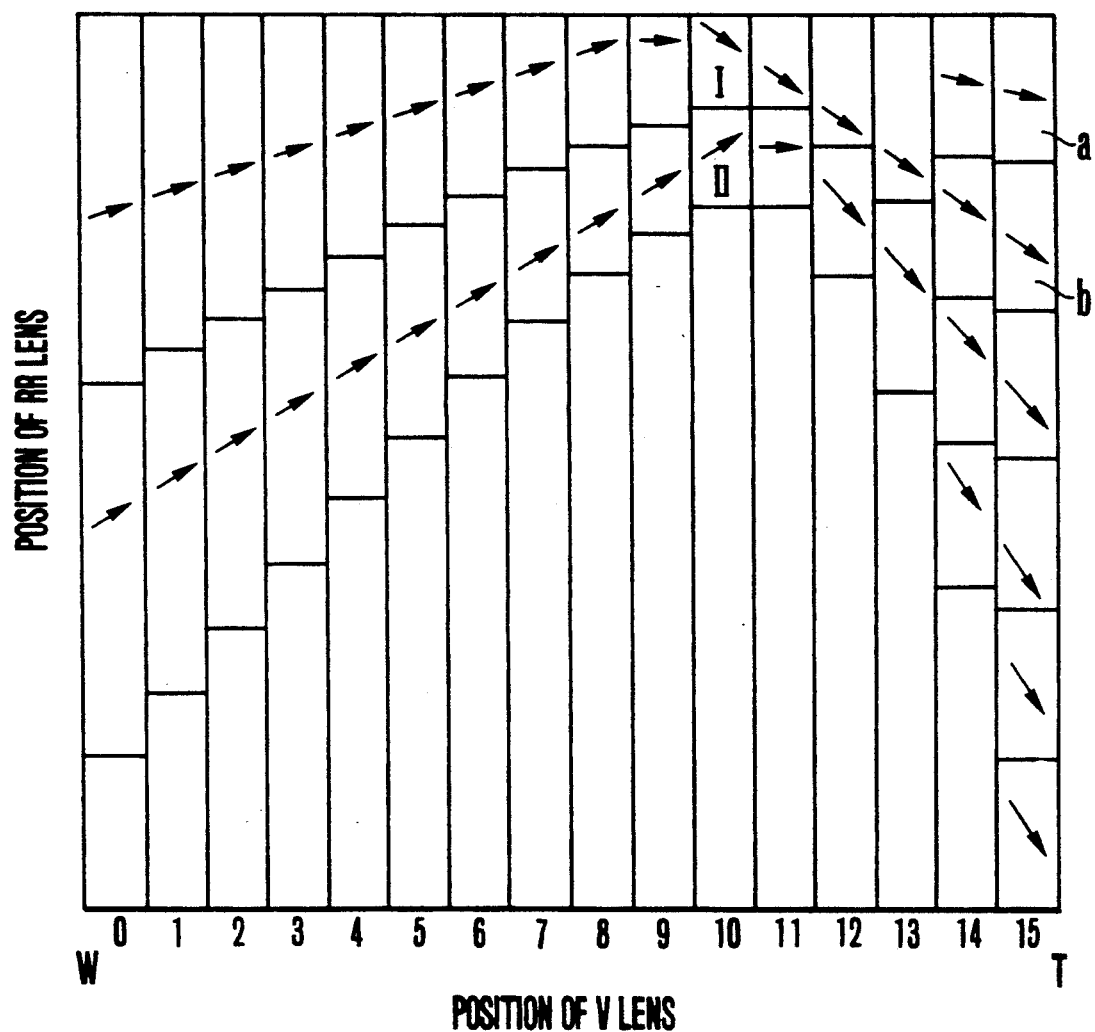
FIG. 6 is a diagram of division of FIG. 5 according to the principle of the invention.

FIG. 6 shows an example of zone division of the interior of the map of FIG. 5. In this example of division, while the movement of the V is divided into equal parts, the direction of movement of the RR is divided by a number obtained by dividing the difference between the gradients of the loci for infinity and the minimum object distance passing through one zone by the target depth of field.

Figure 7:
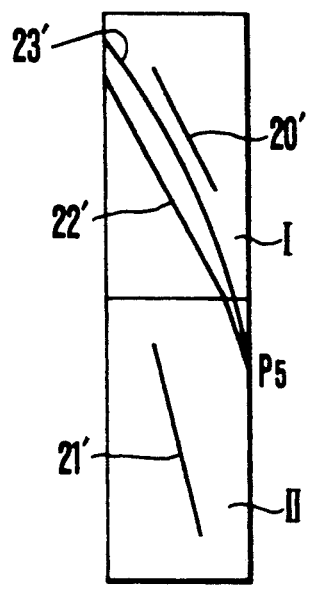
FIG. 7 is a diagram in enlarged scale of a fragment of FIG. 6 for explaining the principle of the control method.

FIG. 7 is a diagram for explaining the method of obtaining the moving speed etc. of the RR from the relative position curve of the V and RR in the zones "a" and "b" of FIG. 6.

In FIG. 7, 23' is a relative position curve passing through a point $P_5$ in the case of the constant object distance. The curves 20' and 21' represent the gradients of the lens movement in the respective zones. (Incidentally, in the case of the constant moving speed of the V, it may be considered to be the moving speed of the RR.) In a case where the V and RR move from the point $P_5$ without the feedback from the AF device, they move by a locus passing through the point $P_5$ and parallel to the curve 21' so long as they lie in the zone "b", and by a locus parallel to the curve 20' so long as in the zone "a". Hence, the total locus becomes as shown at 22'. The discrepancy between the ideal locus 23' and the actual locus 22' becomes the error. In this case, the locus 22' allows focusing to be effected to a farther side than the actual object distance, so that the so-called far focus state is brought about. If the image is determined in one cycle of distance measurement to be out of focus, the moving speed of the RR should be made faster toward the object side in order to bring the RR closer to the ideal locus 23'. Conversely, in a case where focusing is effected to a nearer side than the actual object distance, that is, the image is in the so-called near focus state, the RR should be moved toward the image sensor 129, so that the in-focus state can be approached.

The correction of the representative speed of the RR in a case where the image has been determined to be out of focus is made by employing, for example, the trail-and-error method or the like, in which the representative speed is first increased or decreased, and, if the tendency to approach the in-focus state is found, driving is effected at that corrected speed until the in-focus state is established, or conversely when the tendency to increase the rate of the out-of-focus state is found, the correction of the representative speed is reversed.

Figure 19:
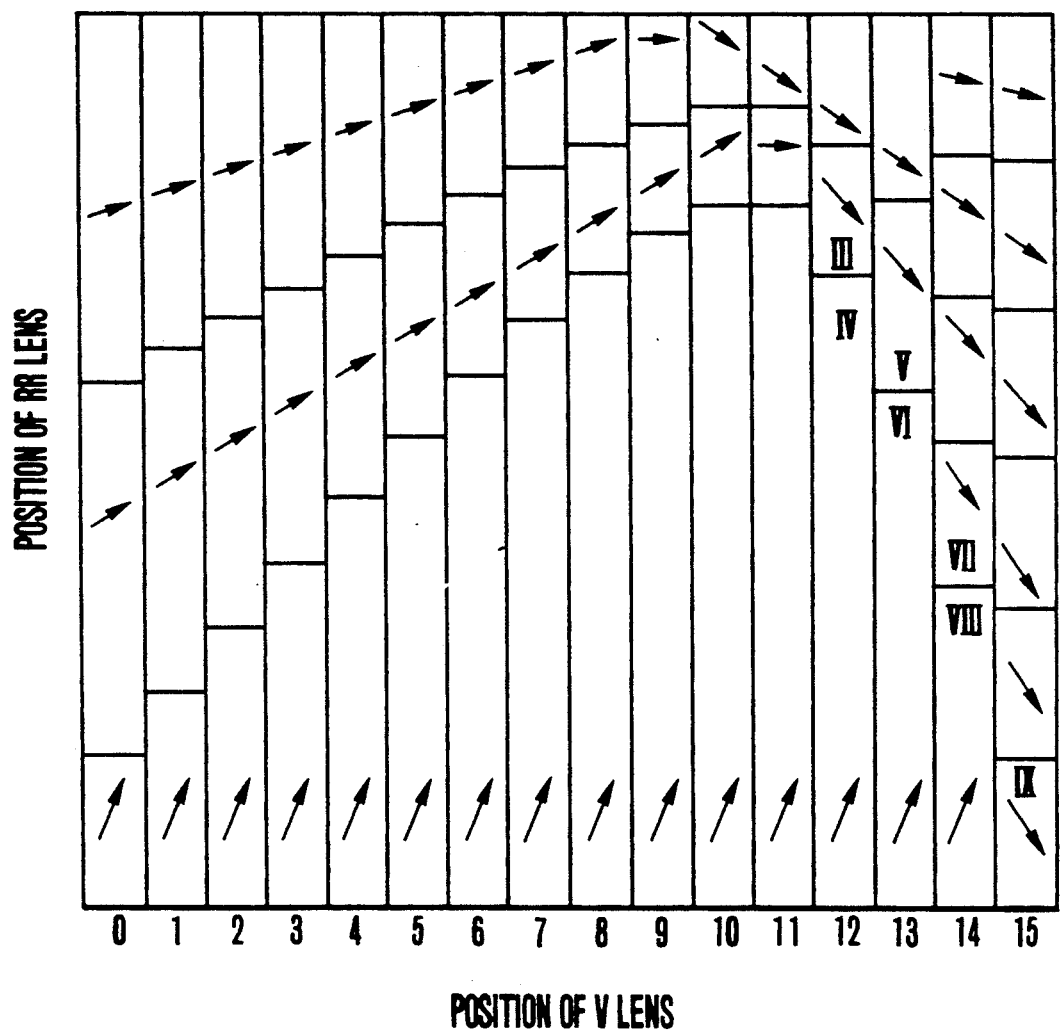
FIG. 19 is a diagram of an example of the driving direction of the rear relay lens.

By the way, the RR has an occasion of changing its moving direction in the middle of the zooming course depending on the object distance as shown in FIG. 5. FIG. 6 and FIG. 19 each show the vectors of the representative speeds in the divided zones when zooming from the wide-angle side to the telephoto side.

In this case, the directions of the representative speeds in the adjacent zones I and II are opposite to each other. Also, in FIG. 19, the directions of the representative speeds in the adjacent zones III and IV, V and VI, or VII and VIII are opposite to each other. From this reason, if the RR exists at the boundary between these adjacent two zones I and II, III and IV, V and VI, or VII and VIII, a slight change of the position of the RR is liable to result in unnecessary vibratory motion across the boundary into both zones. Particularly, when the zones of the large absolute values but different directions of the representative speed are adjacent to each other, the RR largely vibrates across their boundary. This is apt to invite a faulty operation of the automatic focus adjusting (AF) system.

The present invention prevents such a rapid change of the moving direction of the RR so that the erroneous operation of the lens movement is eliminated, thereby making it possible to secure a stabilized lens movement. For this purpose, in a case where the directions of the representative speeds in the adjacent zones are different, the movement of the RR is made to stop in a space intervening between them.

Figure 8:
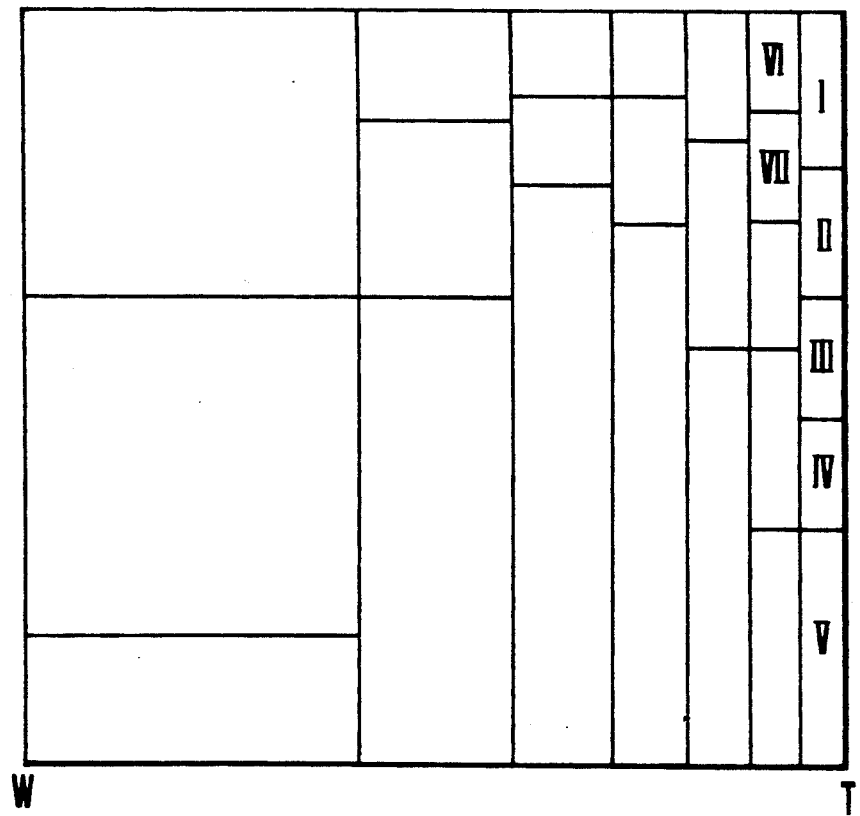
FIG. 8 is a diagram of another example of division of FIG. 5 according to the principle of the invention as with FIG. 6.
Figure 12:
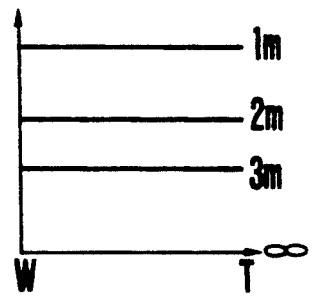
Figure 13:
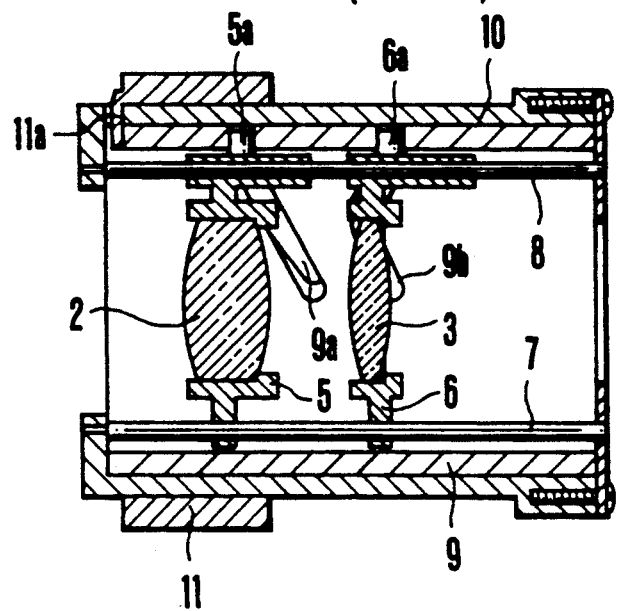
FIG. 13 is a sectional view of the mechanical control mechanism employed to interlock the variator lens and the compensator lens in the zoom lens of FIG. 9.

It should be noted that as the fundamental method of zone division, besides the method shown in FIG. 6, use may be made of a method of zone division shown in FIG. 8. In FIG. 8, the abscissa is partitioned by taking into account the deviation of the linear approximation from the ideal locus. Therefore, in a nearer region to the wide-angle side, the length of the zone in the moving direction of the V gets longer. In a case where the lens position control is made in the aforesaid manner by using FIG. 8, although the accuracy is inferior to that in the case of using FIG. 6, almost no largely different result could be obtained.

Further, the examples of zone division of FIG. 6 and FIG. 8, according to the investigation of the inventors, even when employed in the 6-times class or standard zoom lens, permit a sufficiently high accuracy to be obtained. In general, since the $T \sim W$ movement of the variator is around 20 mm, the length of one zone of the encoder for the variator, even in the example of FIG. 6, may be around 1 mm.

Therefore, the present embodiment has the merit that the precision accuracy of the encoder for the variator may be rougher than in the conventional example.

Figure 2:
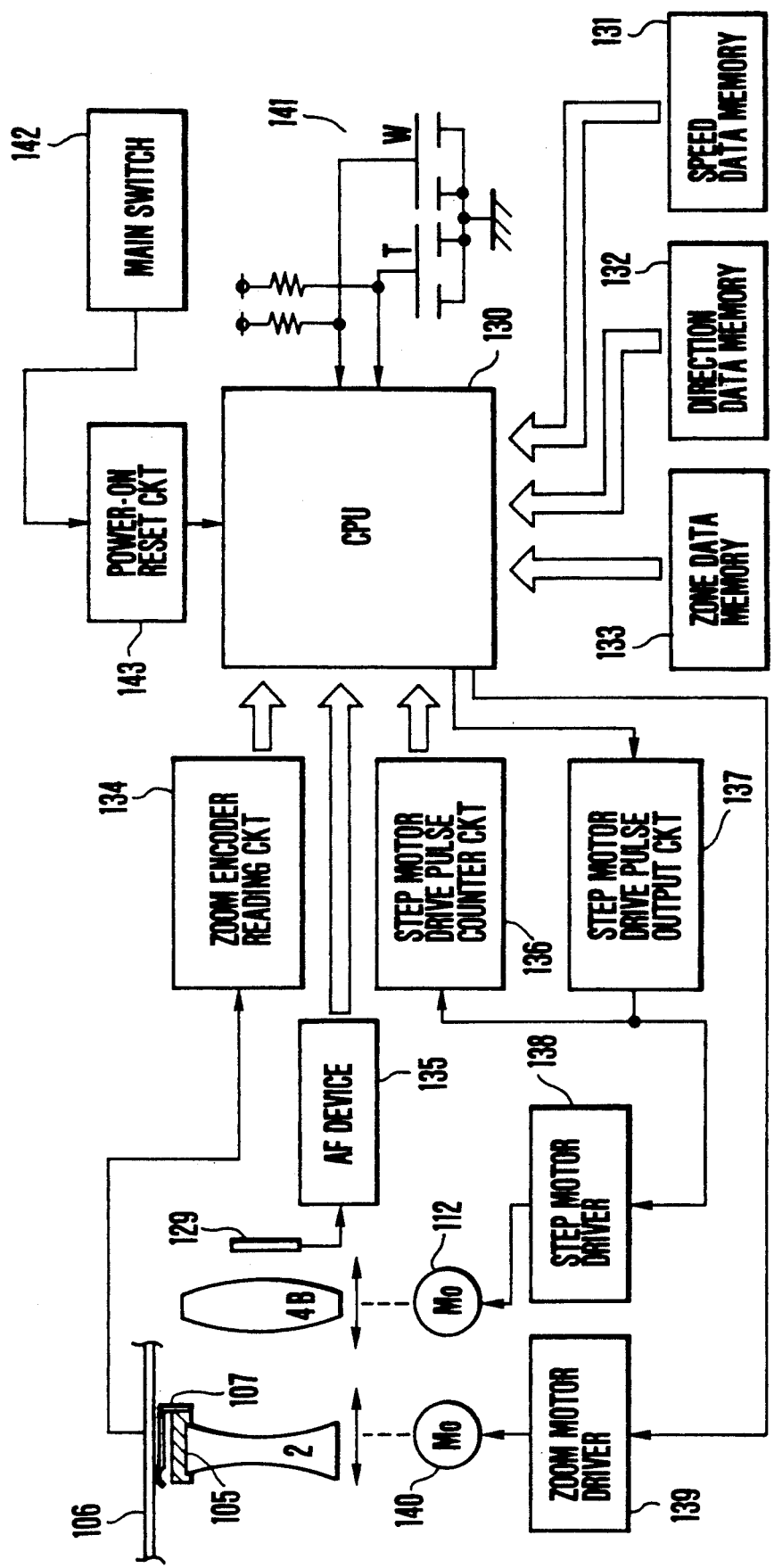
FIG. 2 is an electrical circuit diagram of a control device for controlling the driving of the zoom lens of FIG. 1.

FIG. 2 is an electrical circuit diagram of a control circuit to be combined with FIG. 1.

This control circuit includes a main switch 142 of the camera for actuating, when turned on, a power-on reset circuit 143 to output a reset signal. Responsive to the reset signal, a CPU 130 instructs a step motor drive pulse output circuit 137 to produce a predetermined number of pulses for resetting the RR from the initial reset position outside the actually working range to the 0 address, so that a step motor 112 is driven by a step motor driver 138. Thus, resetting to the 0 address is carried out.

A zoom actuation detecting portion 141 responsive to operation of zoom switch (T, W) produces a T actuating signal or W actuating signal which is transmitted to the CPU 130. Therefore, a zoom motor 140 is driven by a zoom motor driver 139, and at the same time the step motor 112 is driven by the step motor driver 138. In the CPU 130, the fact that the zoom switch (T, W) has been manipulated is translated to a trigger, so that the position of the variator lens 2 is detected by the aforesaid brush 107 and substrate 106, and the variator lens position information is transmitted through a zoom encoder reading circuit 134 to the CPU 130. Also, what number of pulses the step motor 112 is ahead of the reset position is counted by a step motor drive pulse counter circuit 136, and the absolute position information of the RR is transmitted to the CPU 130. The CPU 130 compares, in numerical values, these two pieces of lens position information with a zone data memory 133 having stored therein the data such as those shown in FIG. 6 or FIG. 8, then discriminates that zone which contains the absolute axial positions of the V and the RR, and then reads the zone representative speed determined by each zone from a speed data memory 131 having stored therein representative speed data.

Depending on whether the zoom actuation of the zoom actuation detecting portion 141 is the direction from the wide-angle side to the telephoto side, or the direction from the telephoto side to the wide-angle side, a direction of rotation of the step motor 112 is read from a direction data memory 132 into the CPU 130. In the CPU 130, from the contents read from these data memories and the blur information read from the AF device 135, the direction and speed of movement of the step motor 112 for driving the lens group 4B are determined, and depending on the result of actuation of the zoom switch (T, W), the driving direction of the motor 140 for driving the variator lens 2 is determined. After that, in order that the two motors 112 and 140 move almost simultaneously, an output to the step motor drive pulse output circuit 137 and an output to the zoom motor driver 139 are produced.

Figure 4:
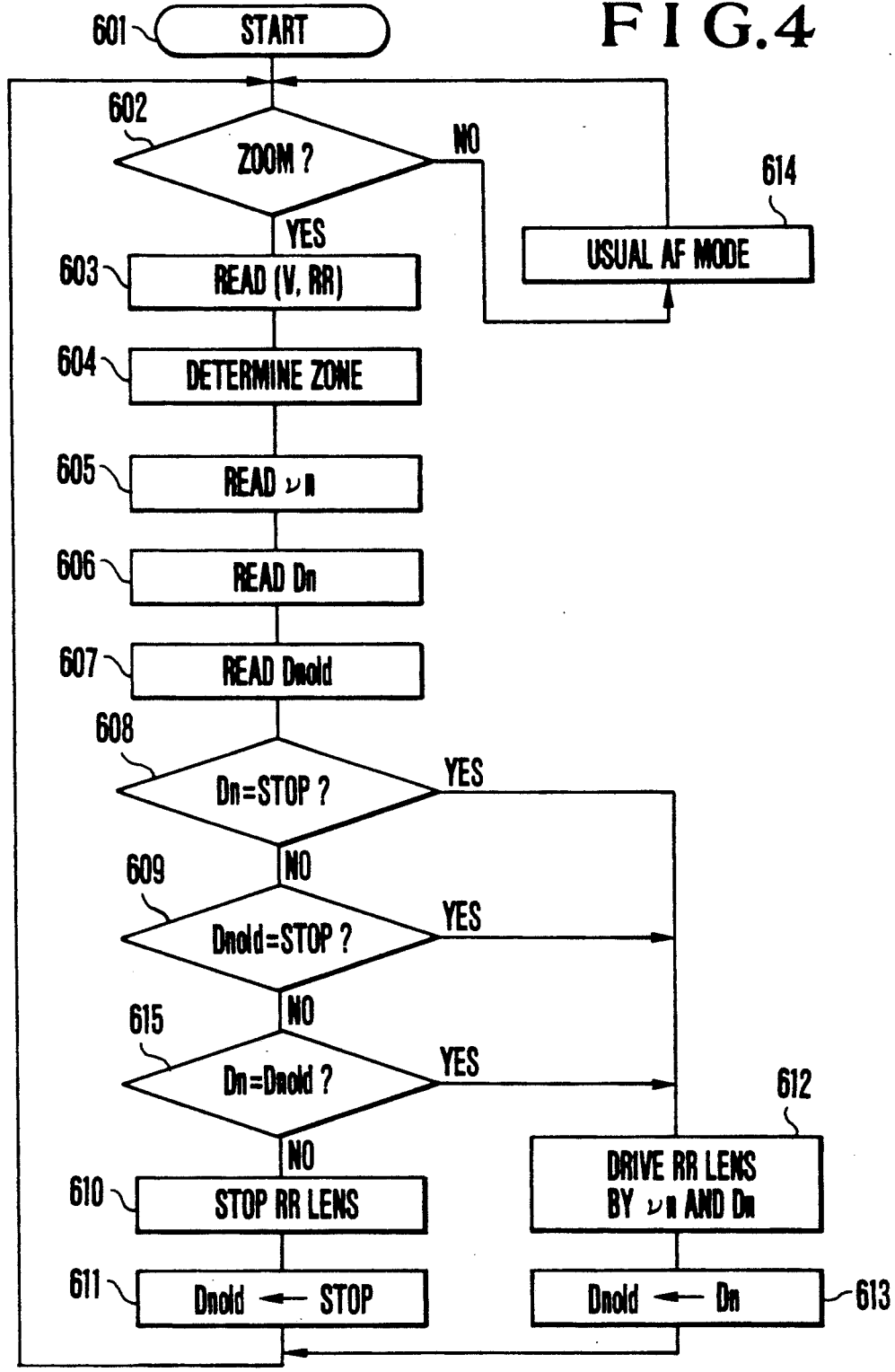
FIG. 4 is a flowchart for a program to be executed in an optical instrument (FIG. 1, FIG. 2) for applying the device of the invention.

FIG. 4 is a flowchart for explaining the sequence of the aforesaid operations of the CPU 130. Incidentally, even during the zooming operation, the distance measuring operation is performed in predetermined periods, and when out of focus, the representative speed is corrected by such a correction method as described above. Yet, the invention has no characteristics in this point. Hence, this flowchart describes only the treatment of the representative speed.

In a step 601, as the electric power source of the instrument such as video camera having incorporated therein the lens embodying the invention is turned on, the execution of the program is declared. Then, whether or not the zoom mode is selected is discriminated in a step 602. If the zoom mode is not set, the usual AF mode for performing the usual distance measurement is operated in a step 614. If the zoom mode is set, the flow advances to a step 603.

In the step 603, by the pulses of the zoom encoder and the step motor, the positions of the variator lens (V) 2 and the lens group (RR) 4B used as both of the compensator and the focusing lens are detected. Based on this result, the zone to which the point of (V, RR) belongs in the map shown in FIG. 6 is detected from the zone data memory 133 in a step 604. The zone representative speed $vn$ in correspondence to this zone is read from the speed data memory 131 in a step 605. Also, the direction Dn of that zone representative speed $vn$ is read in a step 606. Incidentally, this zone representative speed to be memorized may be measured not only in mm/sec, but also in other dimensions, for example, the input pulse interval. Further, in a step 607, the direction $Dn_{old}$ of the zone representative speed in this program executed in the preceding cycle by one is read.

Then, whether or not the direction Dn of the zone representative speed read by now is the stop state in which the moving speed is zero is judged in a step 608. Here, if the direction Dn of the zone representative speed represents the stoppage, a step 612 in which the RR would otherwise be driven at the zone representative speed $vn$ in the direction Dn, is executed so that the RR gets stopped from moving because the zone representative speed $vn$ is virtually zero. Then, the direction Dn of the zone representative speed of the present cycle is memorized as $Dn=Dn_{old}$ in a register in a step 613.

Also, if, in the step 609, the direction $Dn_{old}$ of the zone representative speed of the preceding cycle does not represent the stoppage, whether or not the direction $Dn_{old}$ of the zone representative speed of the preceding cycle and the direction Dn of the zone representative speed of the present cycle are the same is discriminated. If the directions are the same, the steps 612 and 613 are executed. If not, the movement of the RR lens is stopped in a step 610, and further the stoppage is memorized in a register $Dn_{old}$ in a step 611.

Figure 3:
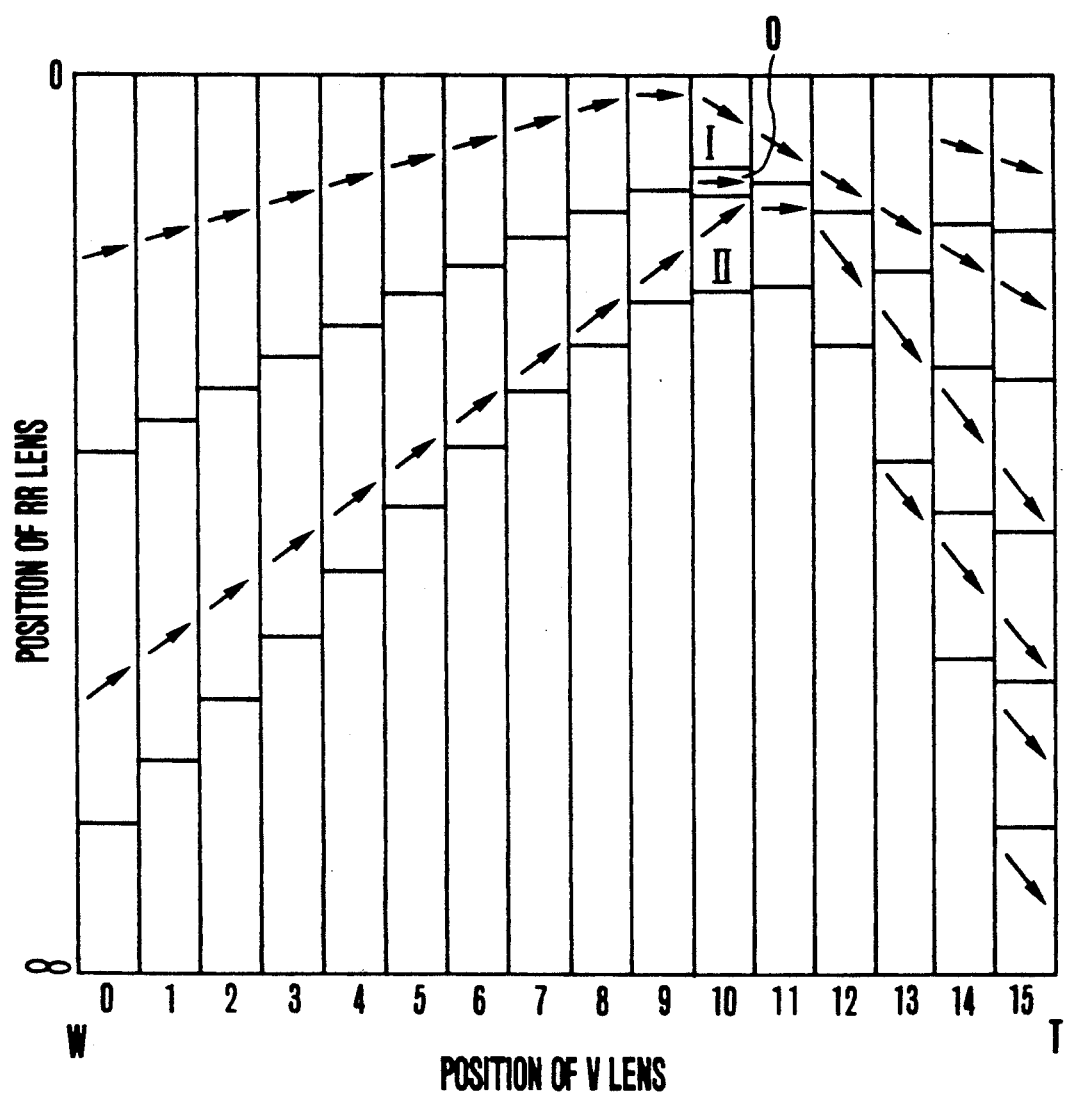
FIG. 3 is a diagram for explaining the invention.

In short, the fact that the direction of the zone representative speed of the present cycle differs from the direction of the zone representative speed of the preceding cycle can correspond to a case where as shown in FIG. 3, in the adjacent zones to each other, the respective directions of the representative speed differ from each other. In such a case, the driving of the RR is once stopped in order to prevent vibratory motions of the RR from occurring. Also, since there is even an occasion that the direction of the zone representative speed is set to the stoppage (the zone representative speed is zero), in a case where the zone representative speeds $vn$ of the adjacent zones are from the driving to the stoppage, or from the stoppage to the driving, the driving of the RR is carried out with the information as it is.

Figure 18:
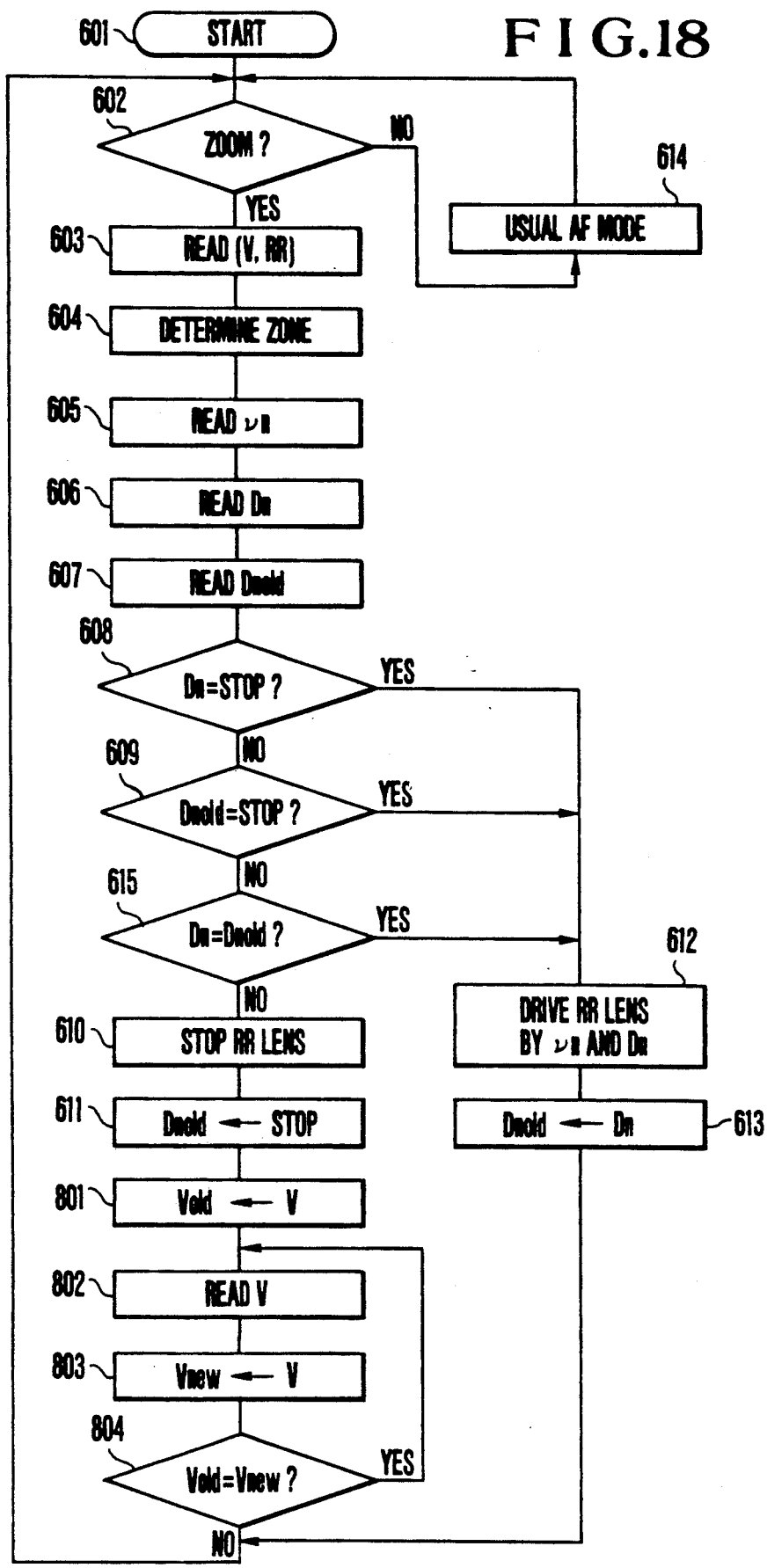
FIG. 18 is a flowchart of another embodiment.

Here, the stoppage of the RR in the step 611 is effective in only one execution time of the program. But, it is also possible that, for example, if the RR has once stopped to prevent vibratory motion from occurring, the RR is left stationary until the value V of the representative speed of the RR changes. In this case, as shown in FIG. 18, a step 801 through a step 804 may be added to the program.

That is, the value V of the representative speed read in the step 605 is memorized in an old-representative speed register Vold in the step 801. A value V of the representative speed is then newly read in a step 802. This value V is memorized in a new-representative speed register Vnew. This routine of the program is held until the value of the old-representative speed register Vold and the value of the new-representative speed register Vnew become different.

Though, in the above-described embodiments, the movement of the RR is stopped by detecting the change of the orientation of the RR, this may otherwise be done by another method in which the coordinates of the boundaries at which the RR is apt to vibrate when moving such as the coordinates (V, RR) of the boundaries, for example, between the zones III and IV, V and VI, and VII and VIII are memorized and, upon detection of the RR lying on that boundary, the driving of the RR is stopped.

Figure 17:
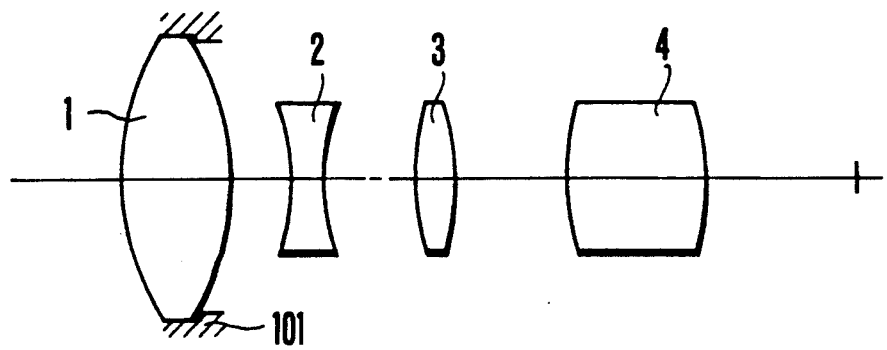
FIG. 17 is a block diagram of another form of zoom lens.

Also, though the embodiments have been described in connection with the lens type shown in FIG. 14, it is to be understood that the invention is applicable even to other lens types such as that shown in FIG. 17.

According to the present embodiments, matching to movement of the first lens group for varying the focal length, the second lens group having both of the compensating and focusing functions can almost simultaneously be moved, thereby giving an advantage that the rate of occurrence of blurring during zooming can be reduced, and the zooming speed also can be increased. Particularly, since the movement of the second lens group is controlled in such a manner that even when it happens that the second lens group enters such a control position that the contradictory behaviors take place, a faulty operation due to rapid movement can be averted. This produces an additional advantage that the second lens group is prevented from being driven by erroneous information, and can be focused with high reliability and accuracy.

What is claimed is:

1. A lens position control evice comprising:
   (a) a first lens group movable along an optical axis, for performing a function of varying an image magnification;
   (b) a second lens group movable along the optical axis, for performing a function of compensation at the time of the variation of the image magnification and a function of focusing, a movement of direction of said second lens gruop being erversed when said first lens group moves to vary the image magnification from a wide angle end to a telephoto end;
   (c) detecting means for detecting positions of said first lens group and said second lens group;
   (d) a memory circuit for memorizing movement control information for said second lens group set in accordance with position information of said first and said second lens groups obtained by said detecting means, said movement control information including at least moving speed information and moving direction information; and
   (e) control means for controlling movements of said first lens group and said second lens group in response to detection of an image magnification varying operation, said control means (1) controlling the movement of said second lens group on the basis of said moving control information read out from said memory circuit, and (2) prohibiting a rapid reversal of the movement direction of said second lens group when said first lens group varies the image magnification.

2. A device according to claim 1, wherein said control means stops said second lens group at least once when reversing its movement.

3. A device according to claim 1, wherein said detecting means includes an encoder.

4. A device according to claim 1, wherein said control means includes a motor for moving said second lens group, and wherein said detecting means detects the position of said second lens group by computing drive pulses of said motor.

5. A device according to claim 4, further comprising additional control means for forcibly moving said second lens group to an initial position, said additional control means being capable of detecting an absolute position of said second lens group by said drive pulses.

6. A device according to claim 1, wherein the moving speed information of said second lens group stored in said memory circuit comprises information corresponding to the positions of said second lens group such that said second lens group is controlled at different speeds according to a variation of the object distance even when the focal length is the same.

7. A device according to claim 1, further comprising focus means for detecting an in-focus state of said second lens group, said control means for moving said second lens group at a moving speed corrected from said moving speed stored in said memory circuit on the basis of outputs of said focus means.

8. A lens position control device comprising:
   (a) a first lens group movable along an optical axis, for performing a function of varying an image magnification;
   (b) a second lens group movable along the optical axis, for performing a function of compensation at the time of variation of the image magnification and a function of focusing;
   (c) detecting means for detecting positions of said first lens group and said second lens group; and
   (d) control means for controlling a moving speed and a moving direction of said second lens group on the basis of (1) position information of said first and said second lens groups obtained by said detecting means, and (2) predetermined positional information of said first and second lens group, said control means, when reversing the moving direction of said second lens group, stopping said second lens group for a predetermined time.

9. A device according to claim 8, wherein said detecting means includes an encoder.

10. A device according to claim 8, wherein said control means includes a motor for moving said second lens group, and wherein said detecting means detects a position of said second lens group by computing drive pulses of said motor.

11. A device according to claim 10, further comprising additional control means for forcibly moving said second lens group to an initial position, said additional control means being capable of detecting an absolute position of said second lens group by said drive pulses.

12. A device according to claim 8, wherein said control means causes said first lens group to be moved uniformly at a previously set speed.

13. A device according to claim 8, further comprising drive means for moving said first lens group uniformly at a previously set speed.

14. A device according to claim 8, wherein said control means varies the moving speed of said second lens group according to information of the position of said second lens group such that said second lens group is controlled at different moving speeds according to a variation of the object distance even when the focal length is the same.

15. A device according to claim 8, further comprising focus means for detecting an in-focus state of said second lens group, said control means for moving said second lens group at a moving speed corrected from the moving speed stored in said memory circuit on the basis of outputs of said focus means.

16. A lens position control device, comprising:
   (a) a first lens group movable along an optical axis, for performing a function of varying an image magnification;

(b) a second lens group movable along the optical axis, for performing a function of compensation at the time of the variation of the image magnification and a function of focusing, a movement of direction of said second lens group being reversed when said first lens group moves to vary the image magnification from a wide angle end to a telephoto end;

(c) detecting means for detecting positions of said first lens group and said second lens group;

(d) a memory circuit for memorizing movement control information for said second lens group set in advance with position information of said first and said second lens groups obtained by said detecting means, said movement control information including moving speed information, moving direction information, and stop information, said stop information being used at a boundary where the moving direction of said second lens group is changed over by the movement of said first lens group in the same direction, or at a boundary where the moving direction information for said second lens group is changed over by a positional change in the same direction of said second lens group; and (e) control means for controlling movements of said first lens group and said second lens group in response to detection of an image magnification varying operation, said control means controlling the movement of said second lens group on the basis of said movement control information readout from said memory circuit.

17. A device according to claim 16, wherein said detecting means includes an encoder.

18. A device according to claim 16, wherein said control means controlling the movement of said second lens group includes a motor for moving said second lens group, and wherein said detecting means detects the position of said second lens group by computing drive pulses of said motor.

19. A device according to claim 18, further comprising third control means for forcibly movign said second lens group to an initial position, said third control means being capable of detecting an absolute position of said second lens group by said drive pulses.

20. A device according to claim 16, wherein said control means causes said first lens group to be moved uniformly at a previously set speed.

21. An optical apparatus having a lens position control device, comprising:

(a) a first lens group movable along an optical axis, for performing a function of varying an image magnification;

(b) a second lens group movable along the optical axis, for performing (1) a function of compensation at the time of the variation of the image magnification, and (2) a function of focusing, a movement of direction of said second lens group being reversed when said first lens group moves to vary the image magnification from a wide angle end to a telephoto end;

(c) detecting means for detecting positions of said first lens group and said second lens group;

(d) a memory circuit for memorizing movement control information for said second lens group predetermined in accordance with position information of said first and said second lens groups obtained by said detecting means;

(e) control means for controlling movements of said first lens group and said second lens group in response to detection of an image magnification varying operation, said control means (1) controlling the movement of said second lens group on the basis of said moving control information read out from said memory circuit, and (2) prohibiting a rapid reversal of the movement direction of said second lens group when said first lens group varies the image magnification.

22. An optical apparatus according to claim 21, wherein said control means stops said second lens group at least one when reversing its movement.

23. An optical apparatus according to claim 22, wherein said memory circuit memorizes stop information, said stop information being used at a boundary where the moving direction of said second lens group is changed over by the movement of said first lens group in the same direction.

24. An optical apparatus according to claim 22, further comprising a motor for moving said lens group, and wherein said detecting means detects the position of said lens group by computing drive pulses of said motor.

25. An optical apparatus according to claim 21, further comprising a motor for moving said lens group, and wherein said detecting means detects the position of said lens group by computing drive pulses of said motor.

26. An optical apparatus according to claim 25, further comprising initiation means for forcibly moving said lens group to an initial position, said initiation means being capable of detecting an absolute position of said lens group by said drive pulses.

* * * * *

UNITED STATES PATENT AND TRADEMARK OFFICE
CERTIFICATE OF CORRECTION

PATENT NO. : 5,200,860

DATED : April 6, 1993

INVENTOR(S) : MASAHIDE HIRASAWA, ET AL.

It is certified that error appears in the above-indentified patent and that said Letters Patent is hereby corrected as shown below:

COLUMN 1

Line 16, "fur" should read --four--.
    Line 67, "understoqd" should read --understood--.

COLUMN 4

Line 42, "in" should be deleted.

COLUMN 5

Line 41, "bodiment" should read --bodiment,--.

COLUMN 11

Line 24, "evice" should read --device--.
    Line 32, "gruop" should read --group--; and "erversed" should read --reversed--.

UNITED STATES PATENT AND TRADEMARK OFFICE
CERTIFICATE OF CORRECTION

PATENT NO. : 5,200,860
DATED : April 6, 1993
INVENTOR(S) : MASAHIDE HIRASAWA, ET AL.

It is certified that error appears in the above-indentified patent and that said Letters Patent is hereby corrected as shown below:

COLUMN 13

Line 44, "movign" should read --moving--.

COLUMN 14

Line 31, "one" should read --once--.

Signed and Sealed this

First Day of March, 1994

Attest:

BRUCE LEHMAN

Attesting Officer    Commissioner of Patents and Trademarks